(12) United States Patent
Correa et al.

(10) Patent No.: US 8,358,764 B1
(45) Date of Patent: Jan. 22, 2013

(54) METHOD AND APPARATUS FOR AUTOMATICALLY SCHEDULING A TELEPHONE CONNECTION

(75) Inventors: Arthur J. Correa, North Chelmsford, MA (US); Roy M. Rosin, Wayne, PA (US); Anna M. Simmons, Norton, MA (US)

(73) Assignee: Intuit Inc., Mountain View, CA (US)

( * ) Notice: Subject to any disclaimer, the term of this patent is extended or adjusted under 35 U.S.C. 154(b) by 839 days.

(21) Appl. No.: 12/179,039

(22) Filed: Jul. 24, 2008

(51) Int. Cl.
*H04M 3/42* (2006.01)
(52) U.S. Cl. .............................. 379/210.01; 379/209.01
(58) Field of Classification Search ............. 379/210.01, 379/212.01, 209.01
See application file for complete search history.

(56) References Cited

U.S. PATENT DOCUMENTS

| | | | | |
|---|---|---|---|---|
| 5,907,600 | A | * | 5/1999 | Fuller et al. .............. 379/106.01 |
| 6,075,992 | A | * | 6/2000 | Moon et al. ................... 455/455 |
| 7,705,218 | B1 | | 4/2010 | Carrigan |
| 7,822,186 | B1 | * | 10/2010 | Boni ......................... 379/210.01 |
| 8,041,765 | B1 | * | 10/2011 | Krishnaswamy et al. .... 709/204 |
| 2003/0206619 | A1 | * | 11/2003 | Curbow et al. ........... 379/210.01 |
| 2009/0290696 | A1 | * | 11/2009 | K. N. ........................ 379/142.04 |

OTHER PUBLICATIONS

Plant Variety Protection Certificate No. 200800269 for Corn PHWMK, filed May 9, 2008.

* cited by examiner

*Primary Examiner* — Rasha Al Aubaidi
(74) *Attorney, Agent, or Firm* — Park, Vaughan, Fleming & Dowler LLP

(57) ABSTRACT

A method and apparatus are provided for automatically scheduling or rescheduling a voice connection (e.g., a telephone call) when one attempt to establish the connection fails. A recipient of a call fails to answer the call, but instead of the caller only having the option of leaving a voicemail message, he or his communication device (e.g., a mobile telephone, a personal digital assistant) automatically issues a separate communication toward the recipient's communication device indicating a time at which the caller will be available to receive a return call from the recipient of the attempted call. Alternatively, or in addition to this separate communication, the recipient's communication device may issue another separate communication toward the caller's communication device, to identify a time at which the recipient is expected to be available to receive a later call attempt.

10 Claims, 3 Drawing Sheets

METHOD AND APPARATUS FOR AUTOMATICALLY SCHEDULING A TELEPHONE CONNECTION

BACKGROUND

This invention relates to the field of communications. More particularly, a method and apparatus are provided for automatically scheduling or rescheduling a telephone connection when one attempt to establish the connection fails.

When a person misses a telephone call (e.g., does not hear or see her communication device ring) or is aware of the call but does not or cannot answer it—perhaps because she is busy or does not have time for the call—she may allow a voicemail device or service to answer the call, may turn off the ringer, or otherwise ignore it. She may very much want or need to talk to the caller, and may hope to do so as soon as both parties are available, but for now she is unable or unwilling to accept the call.

Unfortunately, because there is no direct communication between parties during a failed telephone connection attempt, no information can be passed between them to indicate their availability for a later connection. The caller may leave a voicemail message, but this permits only one-way communication; there is no way for the caller to learn of the called party's future availability. And, even if the called party leaves a voicemail message to identify his availability, the caller must retrieve the message to receive this information.

SUMMARY

In one embodiment of the invention, a method and apparatus are provided for automatically scheduling or rescheduling a voice connection (e.g., a telephone call) when one attempt to establish the connection fails (i.e., the called party does not answer the call). In this embodiment, when a recipient of a call fails to answer, instead of the caller only having the option of leaving a voicemail message, his communication device (e.g., a mobile telephone, a personal digital assistant) automatically issues a communication toward the recipient's communication device indicating a time at which the caller will be available to receive a return call from the recipient of the attempted call.

The caller's availability may be identified by a calendar-type program running on the caller's communication device or on a computer coupled to the device (e.g., by a wired or wireless network). The communication may be sent via the same path (e.g., telephone network(s), the Internet), or may traverse a different path to the called party's communication device. In one implementation the communication comprises an SMS (Short Message Service) communication (e.g., a text message).

In another embodiment, the recipient's telephone device issues a separate communication toward the caller's telephone device when the recipient does not answer the call. Accordingly, in this embodiment of the invention the communication identifies a time at which the recipient is expected to be available to receive a later call attempt.

DETAILED DESCRIPTION

Figure 1:
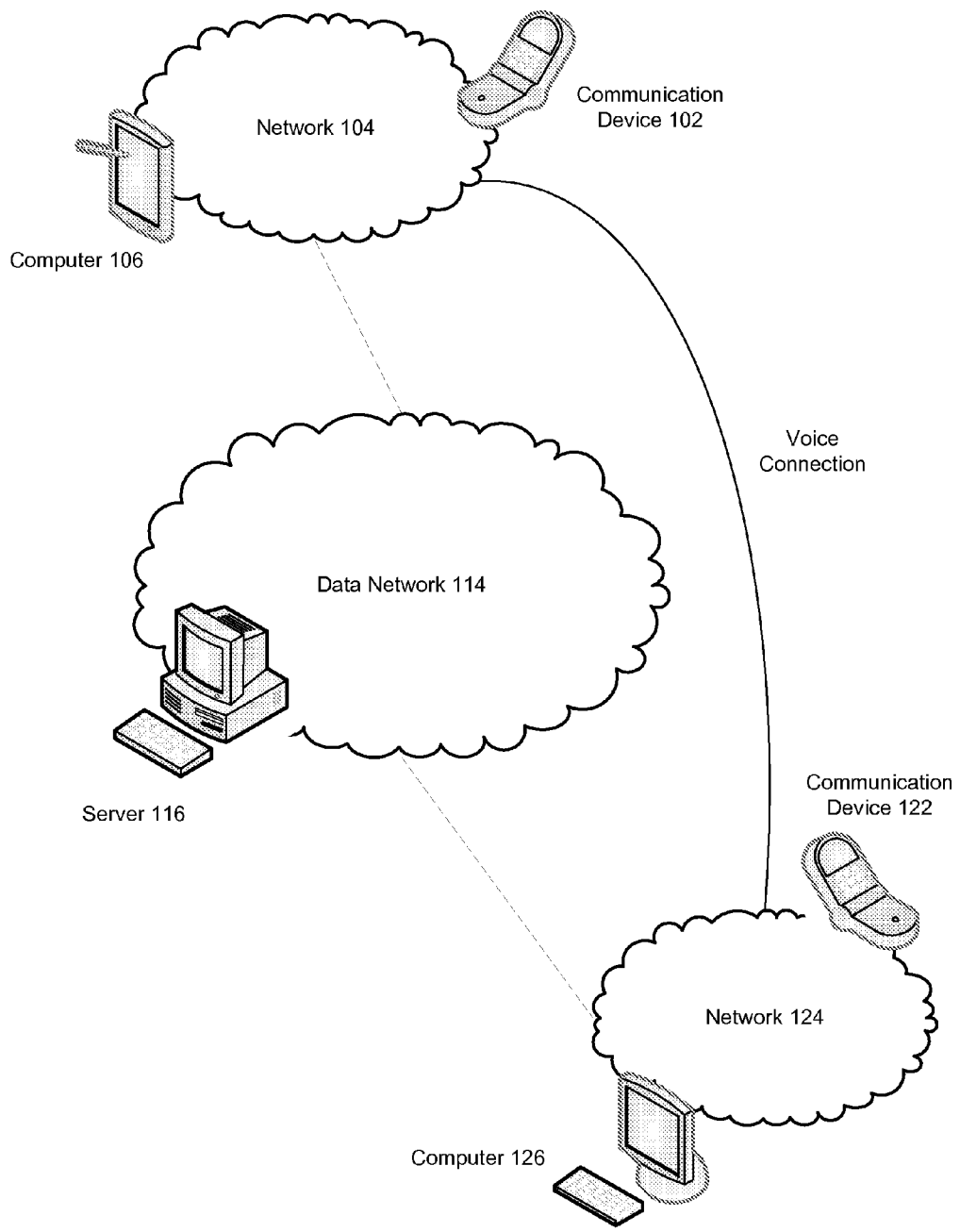
FIG. 1 is a block diagram depicting a communication system in which an embodiment of the present invention may be implemented.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a method and apparatus are provided for automatically scheduling or rescheduling a voice connection (e.g., a telephone call) when an attempt to establish the connection fails. In this embodiment, when the connection fails (e.g., because the called party does not answer), a communication is issued from a communication device of either the caller or the called party to a communication device of the other party, to identify the issuing party's future availability for another connection attempt.

Thus, in one implementation, the scheduling or rescheduling communication is automatically sent from the calling party to the called party, to notify the called party of the caller's future availability. In another implementation, the communication is sent from the called party to the caller to notify the caller of the called party's future availability.

In this embodiment, the communication may be dispatched as part of the attempted voice connection (i.e., as part of the signaling involved in attempting to set up the connection via SS7 (Signaling System 7)). Or, the communication may be transmitted via a separate wired or wireless connection between the parties' devices. In some implementations of this embodiment of the invention, the communication comprises an SMS (Short Message Service) communication, such as a text message.

The communication may therefore traverse one or more telephone networks (e.g., the networks of each party's telephone service provider), a private network such as an intranet, a public switched network such as the Internet, other networks or any combination of these paths.

In an embodiment of the invention, the communication comprises scheduling information regarding the caller or the called party, depending on whether the communication is issued from the caller's or the called party's communication device. The scheduling information may indicate when the issuing party is expected to be available for a telephone call, and may include one or more dates/times (e.g., reflecting any number of periods of availability), a duration of time during which a party's availability has been or should be checked, a particular date or time before which or after which the rescheduled connection must be completed, and/or other information.

A party's availability may be determined by consulting a calendar or scheduling program, which may operate on the party's communication device or on a computing device coupled or coupleable to the communication device. For example, when prompted (e.g., when a call from or to the device is unanswered after a threshold number of rings or period of time), the program may automatically identify the party's next availability.

The parties' communication devices may include a telephone capable of executing applications, applets, add-ons or other loaded/loadable software (e.g., a "smart" phone), a personal digital assistant equipped with a telephony component, a computer equipped with VOIP (Voice over IP) technology, a telephone coupled to a PBX (Private Branch Exchange) system, or any other communication device that is capable of sending and/or receiving data communications.

The information on a party's communication device (or other intelligent device coupled to and referenced by the communication device) to determine that party's availability may include a default duration of time for the call (e.g., minimum, maximum, or specific time periods), a minimum (or maximum) length of time from the current time to look for periods of availability, how many periods of availability to identify, and so on. When a period of availability is transmitted to the other party, it may automatically be entered in that party's calendar program as an appointment (e.g., if there is no conflict, if the issuing party is approved to enter appointments for the receiving party), a counter-proposal may be automatically issued (e.g., in the event of a conflict) or the attempt may be outright ignored or rejected (e.g., if the receiving party has no suitable availability during a default period of time, if the issuing party is unknown or blacklisted).

FIG. 1 is a block diagram of a communication environment in which an embodiment of the invention may be implemented. In FIG. 1, a caller uses communication device 102 to attempt to place a telephone call to communication device 122 of a called party. The parties' devices may be coupled to separate communication networks 104, 124 as depicted, or may be coupled to the same network. Thus, the attempted call connection may be local or long-distance, and may be switched through any number of communication networks.

Networks 104, 124 may be separate local loops or LATAs (Local Access and Transport Area) within POTS (Plain Old Telephone System) and controlled from central offices, may be mobile telephone cells or networks, may be intranets or other data networks carrying VOIP signaling, or any other combination of communication networks or subnetworks now known or hereafter developed.

In FIG. 1, networks 104, 124 are coupled to data network 114, which may be the Internet. In this embodiment of the invention, central server 116 is used to facilitate scheduling or rescheduling of a telephone connection when an attempted connection fails. More specifically, server 116 may facilitate the generation, transmission, receipt and/or processing of a communication dispatched to notify one party of the other party's availability for a later telephone connection.

In particular, if either or both of communication devices 102, 122 is unable to generate, transmit, receive or process such a communication, central server 116 may work on the device's behalf. In this role, central server 116 may communicate with optional computers 106, 126 associated with the caller and called party respectively. For example, if a party's calendar or scheduling software executes not on the party's communication device, but rather on computer 106 or computer 126, central server 116 will interface with that computer to check the party's availability and/or make an entry relating to the other party's availability.

Central server 116 may also be used by a party or a party's communication device to determine how to contact the other party or the other party's communication device. For example, if the caller only knows the called party's telephone number, but not a data address of communication device 122, in order to dispatch a communication to the called party notifying him or her of the caller's availability, communication device 102 may query central server 116 to determine the IP address, MAC address, URL (Uniform Resource Locator) or other address of communication device 122. A party may limit or control the contact information that may be divulged regarding that party and/or an associated communication device, and/or to whom such information may be divulged.

In one method of the present invention, the caller issues a call attempt from communication device 102 to communication device 122. The called party does not answer and so device 102 automatically, or in response to action by the caller (e.g., a press of a button, a voice command), generates a scheduling communication to be sent to device 122. The format of the communication may differ based on the caller's telephone service provider, the type of communication device, the caller's calendar program and/or other factors.

The communication is propagated toward device 122 via any suitable wired or wireless communication paths, or to a separate device if communication device 122 is not configured to receive or process the communication. For example, the communication may be routed to a computer operated by the called party. Communication device 102 may consult server 116 or some other entity to determine whether communication device 102 is capable of processing the scheduling communication and/or where to send the communication. Alternatively, device 102 may already possess this information (e.g., from a previous call attempt).

In another method of the invention the scheduling communication is issued in the reverse direction, from the called party to the caller, to advise the caller of the called party's future availability.

Figure 2:
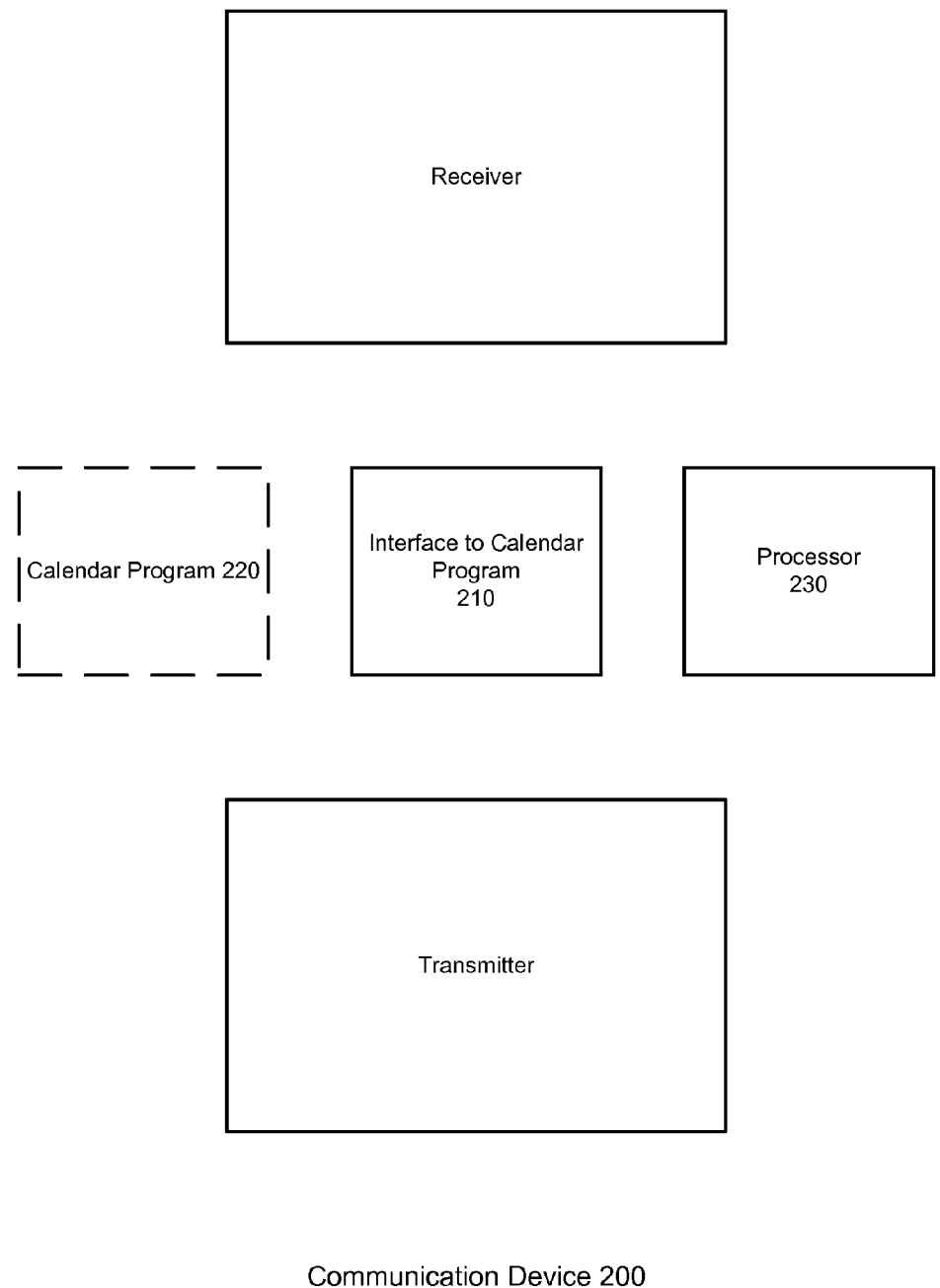
FIG. 2 is a block diagram of a communication device for facilitating the automatic scheduling or rescheduling of a telephone connection, in accordance with an embodiment of the present invention.

FIG. 2 is a block diagram of a communication device for facilitating automatic rescheduling of a failed telephone connection attempt, according to one embodiment of the invention. In this embodiment, device 200 may be a mobile (e.g., cellular) telephone, a computer terminal equipped with VoIP capability, a wired telephone coupled to a PBX or computer server, etc.

Communication device 200 includes a receiver and transmitter for receiving and transmitting audio (e.g., voice) during a telephone call. The device also includes processor 230 for running applications, a Java™ interpreter, applets or other program code, including the code that enables automatic rescheduling of a failed telephone connection attempt. This code may be installed as firmware or software during manufacture of the device, or may be downloaded or installed after it is built.

Device 200 includes interface 210 to a calendar or scheduling program that maintains a calendar for a user of the communication device. The calendar program may be program 220, installed on the communication device 200, or may execute elsewhere (e.g., on a computer accessible from the device). Interface 210 may thus be similar to interfaces that operate on device 200 for accessing other applications or program code that execute on the device, or may be configured to communicate with an external entity to learn of the user's availability for a scheduled or rescheduled telephone connection.

In other embodiments of the invention, any device that is equipped to make or receive a telephone connection and that is capable of executing program logic may be configured to operate a method described herein. For example, in an embodiment of the invention in which the logic for automatically scheduling or re-scheduling a telephone connection is written in Java, any telephone device capable of executing Java may be used. Communication device 200 may also include other components not depicted in FIG. 2, such as a keypad, memory, display, input/output ports, battery, etc.

Figure 3:
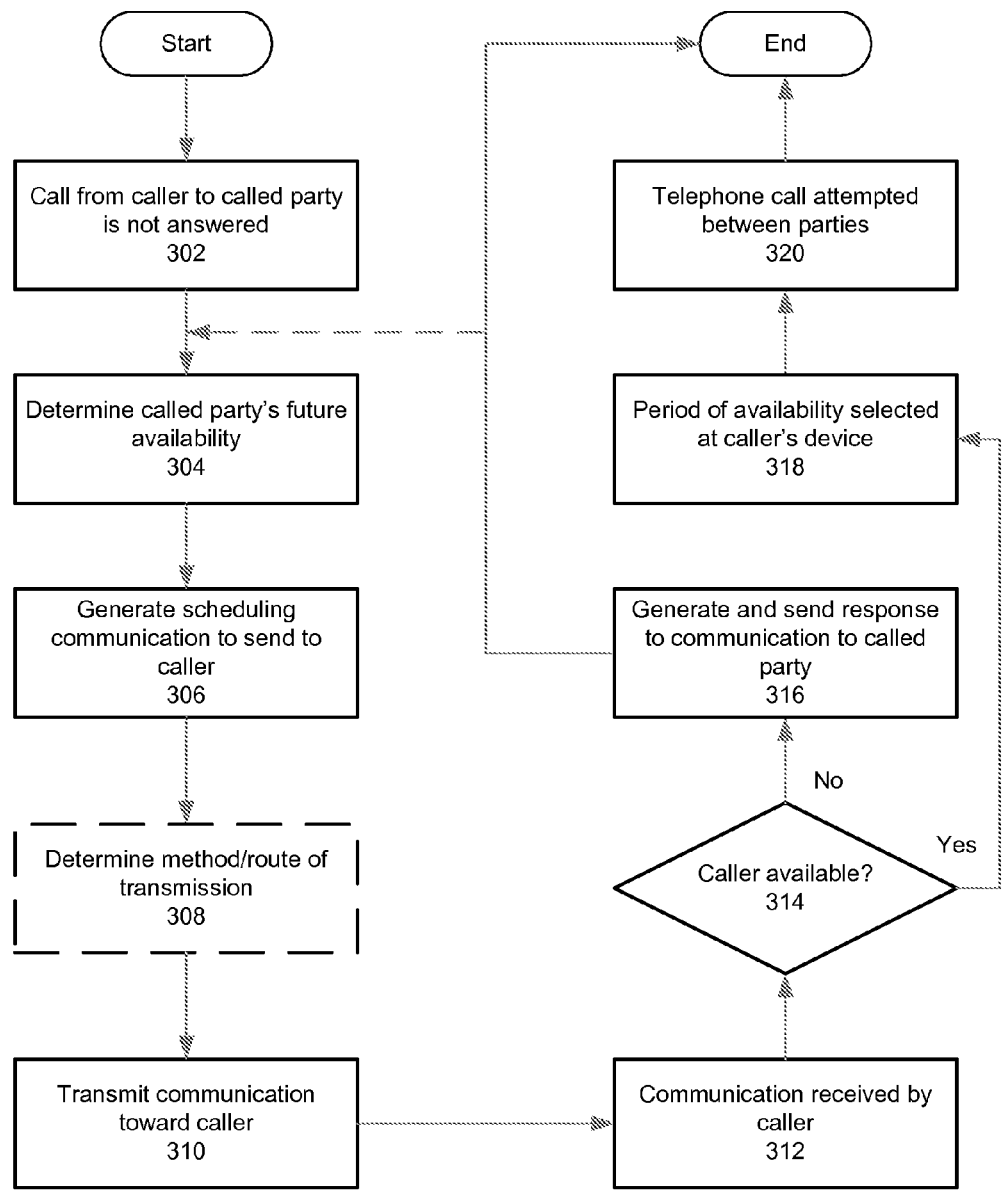
FIG. 3 is a flowchart illustrating one method of automatically scheduling or rescheduling a telephone connection in accordance with an embodiment of the invention.

FIG. 3 is a flowchart demonstrating a method of automatically rescheduling a failed telephone connection attempt, according to an embodiment of the invention. In this embodiment, the scheduling communication is sent from the called party to the caller.

In operation 302, a call from the caller to the called party is not answered. In different implementations, the method may be activated when the call remains unanswered after differing numbers of rings (e.g., 3, 4, 5), and may function in concert with or to the exclusion of a voicemail system or service.

For example, in one implementation the scheduling communication may be the default action to take when a call is not answered; in another implementation the default action may be to connect the caller to a voicemail system or service. The determination of which action to take may depend on the caller's telephone number (i.e., ANI or Automatic Number Indication), the default action programmed by the called party, the called party's selection of a particular action for this particular call (e.g., by keypress), etc.

In the illustrated embodiment of the invention, rescheduling of the attempted voice connection is the preferred action. The caller may be connected to voicemail only after a scheduling communication is generated. Or, the caller may be connected to voicemail only if a scheduling communication cannot be issued (e.g., calendar information is not available, the called party has no availability in the near future) or if the caller is on a "blacklist" or is unknown (e.g., no caller ID information is received).

Thus, the caller may be offered the ability to leave a voicemail message regardless of whether a scheduling communication is sent to the caller from the called party, or scheduling communications may be used in place of voicemail. For example, in an embodiment of the invention in which a scheduling communication is sent from the caller to the called party (instead of vice versa), the caller's device may automatically initiate the communication and the caller may avoid leaving a voicemail message. Alternatively, the caller may be able to make a manual choice to generate a scheduling communication and/or leave a voicemail (e.g., via voice command or keypresses on his device).

In operation 304, a calendar program operating on the called party's communication device automatically searches for one or more future periods of availability of the called party, within any defined parameters (e.g., during specified daily working hours, minimum length of time that constitutes an acceptable period of availability, maximum length of time into the future to search for a period of availability).

Different operating parameters may be applied for different callers, and yet different parameters when the caller is unknown or unidentified. For example, when the unanswered call is from a family member, the next period of availability may be selected regardless of time of day. If the caller is from a different time zone, a period of availability may be selected with allowance for the time difference.

In an alternative embodiment of the invention, the called party's calendar or schedule information may not be available on his or her communication device, but rather on a separate computing device. In this case the communication device may interact with the computing device, and either one may issue the scheduling communication toward the caller.

In operation 306, the called party's communication device uses the availability information to format a scheduling communication to be sent to the caller (the caller's communication device). Any number of periods may be specified in the communication, and may be identified by date/time and duration, starting and ending dates/times, or in some other manner. A date/time may be configured to reflect the called party's time zone and/or the caller's time zone, or some other time zone (e.g., Coordinated Universal Time or UTC).

If the called party has no availability within the specified operating parameters, the scheduling communication may indicate the lack of availability or, alternatively, no communication may be sent.

In operation 308, the called party's communication device may determine how and/or where to send the communication, if it is capable of using multiple different types of communications or communication paths. Illustratively, the communication may be issued to the caller's communication device at that device's telephone number. As another example, it may be sent via a data connection to an address (e.g., IP address) known from previous interaction with the caller or obtained from a third party (e.g., a central server, a telephone service provider).

In one implementation, the scheduling communication may be generated even while the call is still ringing (e.g., after a threshold number of rings), especially if the communication is to be dispatched via a different path from the attempted telephone call. In another implementation the communication may be generated only after the caller hangs up or the call is switched to voice mail.

In operation 310, the scheduling communication is transmitted toward the caller via one or more communication and/or data networks (e.g., via SMS). In this embodiment of the invention, the communication is dispatched from the called party's communication device, but in other embodiments it may be sent from a separate computing device (e.g., a device that stores the called party's calendar data).

In operation 312, the communication is received and processed at the caller's communication device (or computing device). As discussed below, depending on the configuration of the application or applet that handles the communication, the communication may be used to automatically generate an appointment in the caller's calendar program, may be opened and displayed for the caller, or other action may be taken.

In operation 314, the caller's communication or computing device (e.g., the caller's calendar program) determines whether the caller is available during any of the identified periods during which the called party is available. If there is a matching period of availability, the method advances to operation 318; otherwise, the method continues with operation 316.

In operation 316, a response to the scheduling communication is generated and dispatched toward the called party, to indicate that the caller is not available during the called party's identified periods of available. The response may identify one or more periods of availability of the caller, or may simply indicate that the caller is not available.

To generate the response, the caller's device searches its calendar data, and may focus on time periods later than the latest time period identified by the called party, because it may be presumed that the original scheduling communication identified all suitable periods of availability of the called party up to that time.

To arrange a suitable time for the next attempted call, any number of scheduling communications may be exchanged between the parties, over any period of time.

After operation 316, the method may return to operation 304 to allow the called party's communication or computing device to consider the time periods identified by the caller. Alternatively, the method may end if, for example, the caller does not wish to try to connect to the called party again or does not have any suitable periods of availability.

In operation 318, the caller has accepted a time period suggested by the called party. The caller may have opened the communication and taken action to generate an appointment from the communication, or his configuration of the application may have caused it to automatically accept the first or most suitable period of availability and generate an appointment. Therefore, in operation 318 an appointment, conference or other task is scheduled for the caller at the accepted date/time.

In operation 320, a call is placed at the identified and selected period of availability to attempt to establish a telephone connection between the caller and the called party. Depending on the caller's configuration of his communication device, options specified by the called party in the scheduling communication, and/or other information, the caller's (or called party's) communication device may place the call automatically, the caller (or called party) may manually initiate the call, or a third party may initiate the connection (e.g., a central server that helps the parties exchange scheduling communications).

The environment in which a present embodiment of the invention is executed may incorporate a general-purpose computer, or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of automatically scheduling a telephone connection when a first telephone connection is not answered, the method comprising:
   receiving at a first communication device the first telephone connection from a second communication device;
   without the first telephone connection being answered at the first communication device, automatically determining a future time at which an operator of the first communication device is available for a second telephone connection based on one or more operating parameters, wherein the one or more operating parameters are associated with an operator of the first communication device; and
   identifying the future time in a transmission directed from the first communication device toward the second communication device, wherein the transmission is via a different communication path than the first telephone connection, and wherein the transmission occurs simultaneously with the first telephone connection.

2. The method of claim 1, wherein said automatically determining comprises referencing an electronic calendar program for the operator of the first communication device.

3. The method of claim 2, wherein the electronic calendar program executes on the first communication device.

4. The method of claim 2, wherein the electronic calendar program executes on a computer system electronically coupleable to the first communication device.

5. The method of claim 2, wherein said automatically determining further comprises, prior to said referencing:
   detecting that the first telephone connection is not answered.

6. The method of claim 1, wherein said identifying comprises transmitting an electronic mail message toward the second communication device.

7. The method of claim 1, wherein said identifying comprises transmitting a text message toward the second communication device.

8. The method of claim 1, wherein said identifying comprises transmitting a data message toward the second communication device.

9. A computer-readable medium storing instructions that, when executed by a computer, cause the computer to perform a method of automatically scheduling a telephone connection when a first telephone connection is not answered, the method comprising:
   receiving at a first communication device the first telephone connection from a second communication device;
   without the first telephone connection being answered at the first communication device, automatically determining a future time at which an operator of the first communication device is available for a second telephone connection based on one or more operating parameters, wherein the one or more operating parameters are associated with an operator of the first communication device; and
   identifying the future time in a transmission directed from the first communication device toward the second communication device, wherein the transmission is via a different communication path than the first telephone connection, and wherein the transmission occurs simultaneously with the first telephone connection.

10. The computer-readable medium of claim 9, wherein the method further comprises automatically determining a future time at which an operator of the first communication device is available for a second telephone connection while the first communication device is still ringing.

* * * * *